United States Patent [19]

Meylemans et al.

[11] Patent Number: 5,400,367
[45] Date of Patent: Mar. 21, 1995

[54] APPARATUS AND METHOD FOR SYNCHRONIZING AN INPUT DATA STREAM WITH BIT OR PHASE SYNCHRONIZATION

[75] Inventors: Philippe Meylemans, Van Tsestichlaan; Leon Cloetens, Kleine Maastrichterstr., both of Belgium

[73] Assignee: Alcatel N.V., Amsterdam, Netherlands

[21] Appl. No.: 37,932

[22] Filed: Mar. 26, 1993

[30] Foreign Application Priority Data

Mar. 27, 1992 [EP]   European Pat. Off. ............ 92200869

[51] Int. Cl.⁶ ............................................... H04L 7/00
[52] U.S. Cl. .................................. 375/106; 375/110;
375/119; 348/537
[58] Field of Search ............... 375/106, 108, 118, 119,
375/120, 110; 370/105.3, 100.1; 331/17;
348/500, 537

[56]   References Cited

U.S. PATENT DOCUMENTS

| | | | |
|---|---|---|---|
| 4,357,707 | 11/1982 | Delury | 375/119 |
| 4,414,676 | 11/1983 | Kraul et al. | 375/119 |
| 4,653,075 | 3/1987 | Wisniewski | 375/118 |
| 4,794,624 | 12/1988 | Braun et al. | 375/108 |
| 5,134,637 | 7/1992 | Beyer et al. | 375/119 |
| 5,287,359 | 2/1994 | Engelse | 375/120 |

FOREIGN PATENT DOCUMENTS

| | | |
|---|---|---|
| 0225587 | 6/1987 | European Pat. Off. . |
| 0351072 | 1/1990 | European Pat. Off. . |
| 2198016 | 6/1988 | United Kingdom . |

*Primary Examiner*—Stephen Chin
*Assistant Examiner*—Amanda T. Le
*Attorney, Agent, or Firm*—Ware, Fressola, Van der Sluys & Adolphson

[57]   ABSTRACT

The synchronization method realizes synchronization of a digital input data signal with a digital clock signal with which the data signal is rate synchronous. The method consists in sampling the input signal, grouping these samples in successive sets of a plurality of successive ones of the samples, detecting in each of the sets possible value transitions of the samples, determining for each current transition in a set the theoretical position thereof in a corresponding set assumed to be obtained by sampling a nominal data signal which is the input data signal but with pulses having a width equal to the width of the clock signal period, and using the latter theoretical position and the end value of the transition to generate the synchronized input data signal.

24 Claims, 5 Drawing Sheets

STT

| PP | STP | PC | GR | STC |
|---|---|---|---|---|
| 1 | G | 1 | X | G |
| 0 | G | 0 | X | G |
| 1 | G | 0 | 1 | N |
| 1 | G | 0 | 0 | G |
| 0 | G | 1 | 1 | G |
| 0 | G | 1 | 0 | P |
| 1 | N | 1 | X | N |
| 0 | N | 0 | X | N |
| 1 | N | 0 | 1 | G (BL) |
| 1 | N | 0 | 0 | N |
| 0 | N | 1 | 1 | N |
| 0 | N | 1 | 0 | G |
| 1 | P | 1 | X | P |
| 0 | P | 0 | X | P |
| 1 | P | 0 | 1 | G |
| 1 | P | 0 | 0 | P |
| 0 | P | 1 | 1 | P |
| 0 | P | 1 | 0 | G (BL) |

FIG.4

|   | PP | STP | PC | GR | STC |
|---|----|-----|----|----|-----|
|   | I  | G   | I  | X  | G   |

|     |          | PP | STP | PC | GR | STC |        |
|-----|----------|----|-----|----|----|----|--------|
| A   | A1 PP=1  | 0  | 0   | 1  | 1  | 1  | STP=G → 1 |
|     | A2   0   | 1  | 1   | 1  | 1  | 1  |        |
| B   | B1 PC=1  | 1  | 1   | 1  | 1  | 0  | STC=G → 0 |
|     | B2   0   | 0  | 0   | 0  | 0  | 0  |        |

FIG. 5

|   | PP | STP | PC | GR | STC |
|---|----|-----|----|----|-----|
|   | I  | G   | O  | I  | N   |

|     |          | PP | STP | PC | GR | STC |        |
|-----|----------|----|-----|----|----|----|--------|
| A   | A1 PP=1  | 0  | 1(A11) | 1 | 1 | 1 | STP=G → 1 |
|     | A2   0   | 1  | 1   | 1  | 1  | 1  |        |
| B   | B1    1  | 1  | 1   | 1  | 1  | 1  | 1      |
|     | B2 PC=0  | 1  | 1(B21) | 1 | 0(B22) | 0 | STC=N → 0 |

FIG. 6

APPARATUS AND METHOD FOR SYNCHRONIZING AN INPUT DATA STREAM WITH BIT OR PHASE SYNCHRONIZATION

TECHNICAL FIELD

The present invention relates to a method for synchronizing a digital input data signal and a digital clock signal, the data signal being rate synchronous with the clock signal, the method including the steps of sampling the input data signal, grouping the samples obtained by said sampling in successive sets each comprising a plurality of successive ones of the samples, detecting in each of the sets possible value transitions of the samples and processing the value transitions to produce an output signal which is the synchronized digital input signal.

BACKGROUND OF THE INVENTION

Such a method is well known in the art e.g. from the published International Patent Application WO89/09520, wherein the synchronization method is executed by a synchronizing circuit including a sampling circuit which takes sets of three samples: one of the input signal and the others of consecutively delayed versions of the input signal. Synchronism is considered to be reached when no signal transition is detected in a thus obtained set of three samples. The signal to which the set without transitions belongs is the synchronized input signal.

Realization of such a synchronizing circuit and thus of the related synchronization method implies the use of relatively complex delay circuitry.

SUMMARY OF THE INVENTION

An object of the invention is to realize a synchronization method of the above type, but which does not rely on the use of delay circuits.

This object is achieved due to the fact that the method further includes the steps of determining for each current transition detected in a the set the theoretical current position in the sets of samples assumed to be obtained by sampling a theoretical nominal input data signal, and using the theoretical current position and an end value of the transition to generate the output signal.

The theoretical current position of a current transition in the sets of samples assumed to be obtained by sampling a theoretical nominal input data signal is the position of a transition in a set of samples a detected transition would have belonged to if the data signal had been a nominal data signal, i.e. a signal constituted by pulses having the same width as the width of the period of the clock signal. By determining the latter theoretical position, the position of the transition in the synchronized data signal to be generated is known and the latter signal can be reconstructed by producing, at the rate of the clock signal and at the output of the synchronizing circuit, signal values corresponding to the end values of the consecutively detected transitions Located at the above theoretical positions while taking into account the sets without transition for which the signal value at the output of the synchronizing circuit equals the end value of the last transition. For example, if in 4 consecutive sets a transition 0-1 belongs to a first set and a transition 1-0 to a last set of samples, then a digital 1 value has to be generated at the output of the synchronizing circuit during a first clock period, the value has to remain equal to 1 during the two following clock periods and has to become 0 at the fourth clock period.

In this way a new data signal is generated which is bit and phase synchronous with the clock signal, i.e. each bit of the new data signal is a signal pulse having the same width as the clock period and the new data signal is in phase with the clock signal, and which has the same content and frequency as the original data signal.

Features of the invention are that the theoretical current position of said current transition is determined in an iterative way from its real current position in the set it belongs to as Nell as from the real current position and the theoretical current position of a previous transition preceeding said current transition, that each of said sets comprises two subsets of equal numbers of samples, each subset comprising a group of samples and an additional sample equal to the last sample of a previous subset and that the current position of the current transition in the set is determined by the position of the subset to which the transition belongs in the set; and the position of the transition in the subset to which the transition belongs, that the current and previous transitions have a relative position with respect to each other determined by their respective positions in their respective subsets, and that the theoretical current position is determined from the relative position.

Summarizing, the theoretical current position of the current transition is determined from the position of the subset to which the latter transition belongs in its corresponding set, from the mentioned relative position, from the position of the subset to which the previous transition belongs again in its corresponding set and from the theoretical current position of the previous transition.

A table containing for each possible combination of the latter 4 positions the corresponding theoretical current position of the current transition can be drawn up in a theoretical way.

The present invention also relates to a synchronizing device to synchronize a digital data signal with a digital clock signal, the data signal being rate synchronous with the clock signal, the device including
 a sampling means to sample the input data signal
 a grouping means to group the samples obtained by the sampling in sets comprising a plurality of successive ones of the samples;
 a detection means to detect in each of the sets possible value transitions of the samples; and
 a processing means to process the value transitions to produce an output signal which is the synchronized digital input signal,
characterized in that the processing means includes a determining means to determine for each current transition detected in a the set the theoretical current position in said sets of samples assumed to be obtained by sampling a theoretical nominal input data signal and a generation means to generate the output signal using the theoretical current position and an end value of the transition.

BRIEF DESCRIPTION OF THE DRAWING

The above mentioned and other objects and features of the invention will become more apparent and the invention itself will be best understood by referring to the following description of an embodiment taken in conjunction with the accompanying drawings wherein:

FIG. 4 represents a state table STT used in the state determining circuit SD of FIG. 1; and FIGS. 5 and 6 each show the evolution in time of sets of samples related to the first and third row respectively, of the state table STT of FIG. 4.

BEST MODE FOR CARRYING OUT THE INVENTION

Figure 1:
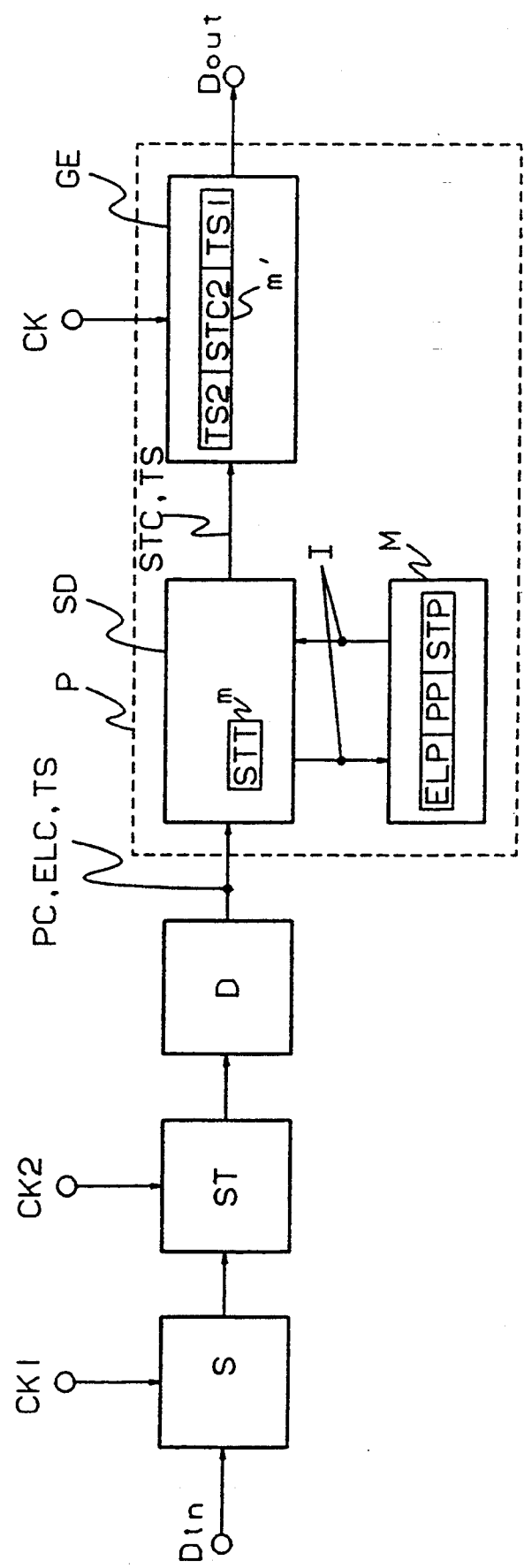
FIG. 1 represents a block diagram of a synchronizing device according to the invention.

The synchronizing device represented in FIG. 1 synchronizes a 4 MHz clock signal CK and a digital data input signal Din, more specifically a Pulse Code Modulation (PCM) signal. These signals are rate synchronous but bit and/or phase asynchronous, meaning that the width of the signal pulses of Din may vary with respect to the width of the clock period and/or that there may be a phase shift between Din and CK. The pulse width of the input signal Din is equal to (k244×83) nanoseconds where k is the number of successive pulses having the same logical value, and a possible phase shift may not exceed 61 ns.

The synchronizing device comprises a sampling circuit S, a samples storage module ST, a transition detection device D and a processing module P all connected in series between a data signal input Din and a data signal output Dout.

The digital input signal Din and a 32 MHz digital clock signal CK1 are applied to respective inputs Din and CK1 of the sampling circuit S, whilst an 8 MHz digital crock signal CK2 and the digital clock signal CK are applied to like named control inputs CK2 and CK of the storage module ST and of the processing module P respectively. A synchronized data signal Dout is generated at output Dout of P, which comprises a state determining circuit SD and a memory module M interconnected by a bidirectional interface I and a data output signal generation module GE. The detection device D is coupled to the data signal generation module GE via the state determining circuit SD. An output of GE is connected to the data signal output Dout and a control input CK of GE is connected to the control input CK.

The purpose of the synchronizing device is to generate a digital data signal Dout which is fully, i.e. bit, rate and phase, synchronized with the digital clock signal CK and has the same data content as the digital data input signal Din. To realize this aim the latter device samples Din, groups the samples in groups of 4 samples and detects the value transitions of Din in the obtained groups. It then determines the successive values of Dout using a state table STT (FIG. 4) which for all possible combinations of the position of a current transition in a set, including 2 consecutive groups of samples, and of the position of a previous transition in a previous such set and of the position of that previous transition in tile set it would have belonged to had the input signal been nominal gives the position of the current transition in the set it would have belonged to again had the input signal been nominal, and generates Dout based on the latter successive values and under control of CK. The above principle and how such a state table STT is drawn up is described hereafter in more detail.

In S the data input signal Din is sampled by the clock signal CK1 at a rate of 32 MHz. Sampling of a nominal input signal, i.e. a signal with pulses having a pulse width of 244 ns which is the width of the signal period of CK, consequently produces 8 samples per pulse, whilst sampling of a maximum duration pulse, i.e. a pulse having a width of (244+83)ns, and of a minimum duration pulse, i.e. a pulse having a width of (244−83)ns, produces 11 and 5 samples per pulse respectively.

In the storage module ST the latter samples are grouped in groups of 4 samples under control of the 8 MHz clock CK2 and in the detection circuit D the 4 samples of each such group are stored in 4 successive last stages of a 5-stage register, the last bit of a previous set being stored in the first stage of this register. For instance, and as shown in the table SAT1 of FIG. 2 which will be explained in detail later, when the content of a register R1 of D, which corresponds to the above mentioned subset of sample, is 00000 at the moment a group of 4 new samples 0011 has to be stored in a second register R2, then the latter samples are stored in the last stages of R2, whereas the last sample 0 of R1 is registered in the first stage 0 of R2. This means that a subset of samples then stored in R2 is 00011, 0011 being a group of 4 successive samples and 0 being the last sample of the previous subset.

The subset of 5 samples thus stored in each of the registers are called a window, whilst those of two consecutive windows are called a big window.

As explained hereafter the synchronization method executed by the device of FIG. 1 is based on the location of signal value transitions in the mentioned windows and the reason for the above copying of the last sample of a window as a first sample of the next window, is to permit detection of transitions occurring between two consecutive groups of 4 samples.

It has to be noted that a big window has been chosen to contain two groups of 4 samples because a nominal signal pulse produces 8 pulses, whilst a window has been chosen to contain one group of 4 samples to be sure that only one transition can occur in a window, as will be explained later.

Figure 2:
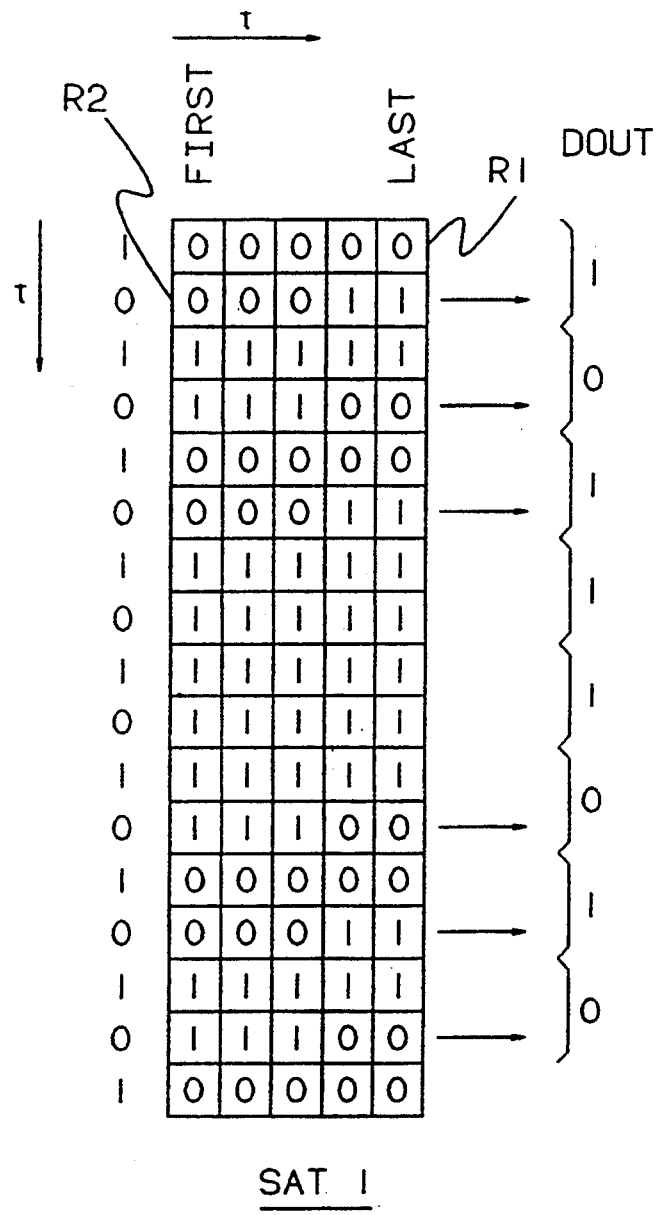
FIG. 2 is a sampling table SAT1 representing the evolution in time of sets of samples stored in the detection module D of FIG. 1 and obtained by sampling a nominal input signal.

First a nominal input signal is considered and reference is made to FIG. 2 which shows a sample table SAT1 representing the evolution in time of successive windows of samples of such a nominal signal. In this figure time axes go from left to right and from top to bottom. Each big window is stored in two successive 5-bit registers of D, the first window in time being indicated by a 1, whilst the second one is indicated by a 0, the 0 or 1 being indicated at the left side of the registers. At the right of the registers is indicated the corresponding value of the output signal Dout to be generated for each of the big windows.

It has to be noted that the consecutive contents in time of R1 and R2 represented in FIG. 2 are not different physical registers. Indeed, in fact only one register is needed to store the contents of a window and the position of that window in its corresponding big window, i.e 1 or 0. when a new group of samples is received, the contents of the register is overwritten, which means that D has to process the contents of the register and pass the results thereof to SD before the latter new group is received. To simplify the description of the synchronizing device it is however assumed that 2 registers, each representing a window and together representing a big window, are used in D. Implementation of D using only one register and the value of PC instead of 2 registers is obvious for a person skilled in the art, based on the description of D with two registers R1 and R2.

Since for a nominal signal the earlier mentioned sampling operation produces 8 samples per pulse, only one value transition can occur in a big window stored in D. When D detects a digital low to high or 0/1 transition in a big window the value of the synchronized output signal Dout has consequently to be made equal to 1, whilst for a detected high to low or 1/0 transition the latter signal has to be equal to 0. In case no transition is detected the value of the output signal Dout has to be maintained the same as the previous one.

For example, in the first big window of the table SAT1 shown in FIG. 2 and registered in R1 and R2 the circuit D detects a transition from 0 to 1 as a consequence of which a value of Dout equal to 1 has to be generated.

Figure 3:
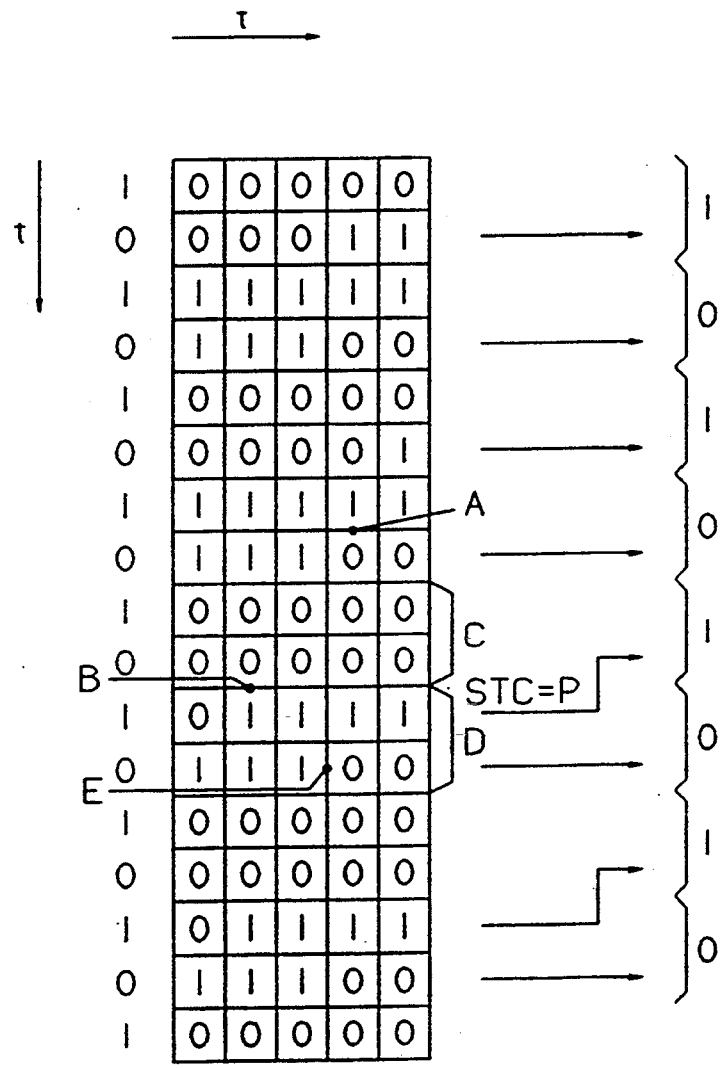
FIG. 3 shows a sampling table SAT2 similar to that of FIG. 2 but for a not nominal input signal.

In a not nominal input signal the width of the constituent pulses is smaller or larger than those of a nominal signal so that in the former case more than one transition can occur in a big window as can be seen in the table SAT2 FIG. 3 which is similar to SAT1 of FIG. 2 but represents successive windows of samples of an input signal comprising nominal pulses followed by short high pulses of value 1 and long low pulses of value 0. In a big window D, a first transition indeed occurs from a long low pulse starting at instant A to a short high pulse starting at instant B whilst a second transition occurs when the latter short high pulse goes to low at instant E. However, in a 5-sample window only one transition can occur since sampling of a minimum duration pulse produces 5 samples.

As a result of the reduced or increased width of a pulse, a transition may have to be correlated with a previous big window or with a next big window, meaning that if the input signal had been a nominal signal then the transition would have occurred in this previous or next big window.

For example, in the samples table SAT2 of FIG. 3 sampling of the long Low pulses produces 10 samples of value 0 and sampling of the short high pulses produces 6 samples of value 1 starting for instance at A and B respectively. In this table there is no transition in the big window C so that Dout should theoretically remain the same as for by window E, i.e. 0. However, for the above high to low or 1/0 transition at instant E in big window D the following reasoning may be made: had the long low pulse from A to B been a nominal pulse giving rise to 8 samples then the transition 0/1 at instant B would have appeared in the big window C and for this reason the transition in big window D may be said to be correlated with the previous big window C as is indicated by arrow STC=P. As a consequence the value of Dout for the big window C should be equal to 1 which is the end value TS of the 0/1 transition in the big window D. A similar reasoning is applicable to all transitions of the figure and such transition may be correlated with a previous current or next bit window, this being further indicated by STC=P, STC=G and STC=C respectively. In each of these cases the value of signal Dout is equal to the end value TS of a transition i.e. 0 for a 1/0 transition and 1 for a 0/1 transition.

Reference is now made to FIG. 4 for the description of a state table STT drawn up for all possible previous and present transitions.

More particularly, this table STT contains 5 fields n1, PP, STP, PC, GR and STC:

PP is the position of the window a previous transition belongs to in the corresponding big window, its value being 1 if the transition is located in the first window of this big window and 0 when it is located in the second window thereof;

PC is the position of the window a current transition belongs to in the corresponding big window and is determined in a similar way as PP;

STP indicates to which big window the previous transition was correlated, i.e. G, N, P to indicate correlation with the current, next and previous big window respectively;

GR indicates the relative position of the current transition in the window it belongs to considered with respect to the position of the previous transition. GR equals 1 when the current transition occurred relatively later in the window it belongs to than the previous transition, 0 when it occurred earlier or at the same time and X when the value of GR is of no importance;

STC indicates the correlation for the current transition.

The state table STT is drawn up by determining for each possible combination of PP, STP, PC and GR the value of STC, as will now be described by making reference to FIGS. 5 and 6 which relate to lines 1 and 3 of this state table.

When for instance a current transition 1/0 occurs in the first window B1 of a big window B, so that PC=1, whilst the previous transition 0/1 also appeared in the first window A1 of a previous big window A, so that PP=1, and when it is assumed that this previous transition 0/1 is correlated to the big window A it belongs to, so that STP=G, then both transitions necessarily have to be located in different big windows. Indeed, if they had appeared in the same window they would have been separated by a pulse producing less than 5 samples. If, as in FIG. 5, the big windows A and B containing the transitions are consecutive ones the current transition 1/0 has to be correlated to the big window B it belongs to, i.e. STC=G. Indeed, it cannot be correlated to the previous big window A because it has been assumed that there is already a transition 0/1 correlated to that big window A. It also cannot be correlated to the next big window because PC and PP are both equal to 1. This means that the number of samples between the latter transitions is between 5 and 11, which corresponds to one sampled pulse. 11 pulses can indeed not be produced by two consecutive short pulses because of the earlier mentioned restriction on the pulse width, i.e. the nanoseconds. In case of 2 consecutive pulses their width has thus to be between 405 and 571 ns, while 2 consecutive short pulses sampled by 11 samples have a width of 327 ns. The above reasoning is also applicable when the two transitions are separated by 10 samples.

The transition in B can thus not be correlated with the next big window, since this would imply two pulses between the consecutive transitions in A and B.

A similar reasoning can be followed in case the big windows containing the transitions are not consecutive ones, For the above situation the relative position of the transitions in the windows, i.e. the value of GR was not needed to determine STC.

In another example shown in FIG. 6 relating to line 3 of the table STT the current transition 1/0 is detected in the second window B2 of a big window B, so that PC=0, whilst the previous transition 0/1 belongs to the first window, A1 of a big window A, so that PP=1. The previous transition 0/1 is supposed to be correlated to the big window A it belongs to, so that STP=G and the relative position of the previous and current transition in their respective windows is such that the current transition occurred relatively later than the previous transition, so that GR=1. In such a case the transitions are separated by 13 to 15 samples. Indeed, supposing the previous transition occurred at A11, which is the earliest position it can occur, the current transition can at the earliest occur at B21 and at the latest at B22. In the first case the transitions are separated by 13 samples, whilst in the second case they are separated by 15 samples. As a result the transitions have to be separated by two pulses since the case of 3 short pulses producing 15 samples is excluded because of the earlier mentioned restriction on the minimum width of the pulses. Since the transitions are separated by 2 pulses the current transition has to be correlated to the next big window, so that STC=N.

Reasonings as above can be followed for all possible values of PP, PC and GR and for one value of STP, e.g. STP=G. This leads to the upper part of the state table STT of FIG. 4 where the states are the type of correlation and the state transitions are determined by PC, PP and GR. The middle and lower parts of the state table STT for which STP=N and STP=G respectively, can be deduced from the upper part of the table for which with STP=G by shifting the value of STC over one big window forwards or backwards respectively. In this way the remaining part of the state table, i.e. for which STP=N and STP=P, is obtained with two exceptions however. ST=N and ST=P are indeed not shifted forwards, backwards respectively, since this implies that the current transition would have to be correlated with the next to following, respectively preceeding to previous, big window and it was decided in the current embodiment not to correlate a transition further than to the adjacent big windows. For this reason in these cases the transition is correlated to the current big window, i.e. STC=G, and a bit is supposed to be lost, which is indicated in FIG. 4 by (BL).

It has to be noted that correlating the transitions further than to an adjacent window, makes it possible to handle even larger deviations for the nominal pulse width and greater phase shifts than mentioned earlier. This however implies extension of the number of possible values of STP and STC and thus extension of the state table STT.

From the above it follows that the state table STT by means of STC indicates for each detected current transition in a big window whether the current transition has to be correlated with the current, next or previous window, this indication being based on the detected position of the current transition and of the previous transition in the window they belong to, i.e. PC and PP, on their relative position GR and on the previous correlation indication STP which was determined for the previous transition. With the help of STC and of the end value of the transitions the signal Dout can be generated as will now be described by again referring to FIG. 1 and assuming that the above state table STT is used in a program running in a processor module m of SO and that in the memory M are stored the following parameters relating to a previous transition:

PP indicating, the window of the big window wherein this previous transition was located;

ELP indicating the exact position of the previous transition in this window;

STP indicating the big window the previous transition was correlated to.

Din is sampled in the sampling circuit S by the clock signal CK1 and the obtained samples are grouped in groups of 4 in the storage module ST under control of the clock signal CK2. The groups of samples are stored in the 5-stage registers by D thereby providing the earlier mentioned windows and big windows. D includes an obvious circuit (not shown) to detect signal transitions and to determine for each such transition the value of the parameter PC, i.e. the location of the window the transition belongs in the corresponding big window, and the exact location ELC of the transition in this window. Both parameters PC and ELC are transferred from D to the state determining circuit SD together with the end value TS of the transition. SD stores PC and ELC in the memory module M, but before doing so, it retrieves from the same storage location the parameters PP and ELP which are in fact the values of PC and ELC for a previous transition. From these parameters, ELC and ELP, SD then determines the corresponding value of GR and it additionally retrieves from M the parameter STP. By means of the parameters PP, STP, PC, GR it interrogates the state table STT to find the correlation type STC of the current transition. STC is stored in M thereby overwriting the previously stored value STP.

To be noted that at start-up of a device the values stored in M are initialized at PP=1, ELP=1 and STP=G.

The parameters STC and TS are transferred to the data signal module GE.

If no transition occurred in the considered big window, this is indicated by a special code for STC and TS.

G includes a storage module m' in which the end value of the last transition, hereafter called TS1 is stored, together with the values of a current parameter TS called TS2 and its corresponding parameter STC called STC2. TS2 is delayed in GE before being produced at the output thereof until next values of TS and STC, hereafter called TS3 and STC3 are received. This to take into account the values of STC2 and STC3, as explained hereafter.

To be noted that if the values of STC and TS are equal to the above mentioned special code, then TS3 and STC3 are made equal to TS2 and G respectively at their entry in GE.

Following table shows the practically possible combinations of STC2 and STC3:

| STC2 | STC3 |
| --- | --- |
| G | G |
| G | N |
| P | G |
| P | N |
| P | P |
| N | N |

If STC2 and STC3 are both equal to G then TS2 is produced at the output of GE and STC3, TS3 and TS2 are stored in m' at the locations where STC2, TS2 and TS1 were stored. The same is applicable to STC2=G and STC3=N and to STC2=P and STC3=G, and STC2=P and STC3=N in the latter two cases TS1 being equal to TS2.

If STC2 and ST3 equal P, which means that TS1=TS2, then TS3 is generated at the output of GE and STC3, TS3 and TS3 are stored in m' at the locations where STC2, TS2 and TS1 were stored respectively.

If STC2 equals N and STC3=N, then TS1 is generated at the output of GE and STC3 and TS2 are stored in m' at the location where STC2 and TS2 were stored respectively. The thus generated values of TS at the output of GE under control of CK constitute the signal Dout which is the input signal Din synchronized with the clock signal CK.

To be noted that in case of the earlier mentioned extension relating to the correlation of a transition with a big window laying further than the adjacent big windows, GE becomes more complex and more consecutive values of STC and TC have to be stored.

The realization of the above described synchronizing device is obvious to a person skilled in the art taking the above functional description of the elements thereof into account. For this reason it is not described in more detail.

The synchronizing device can be completely realized by means of hardware modules or by using processors with software programs realizing the functions of the detection device D and of the processing module P as in the described embodiment.

Since phase shifts of Din with respect to CK correspond with the shortening or widening of a pulse the described synchronizing device not only performs bit synchronization, but also phase synchronization.

While the principles of the invention have been described above in connection with specific apparatus, it is to be clearly understood that this description is made only by way of example and not as a limitation on the scope of the invention.

We claim:

1. A method for synchronizing a digital input data signal (Din) and a digital clock signal (CK), said digital input data signal (Din) being rate synchronous with said digital clock signal (CK), said method including the steps of sampling said digital input data signal (Din), grouping samples obtained by said sampling step in successive sets each comprising a plurality of successive ones of said samples, detecting in each of said successive sets possible value transitions of said samples, and processing of said value transitions under the control of said digital clock signal (CK), to produce an output signal (Dout) which is the digital input signal (Din) synchronized with said digital clock signal (CK), said processing step includes the steps of determining for each current value transition detected in said successive sets a theoretical current position (STC) in said successive sets of samples assumed to be obtained by sampling a theoretical nominal input data signal, and using said theoretical current position (STC) and an end value (TS) of said current value transition to generate said output signal (Dout).

2. A method according to claim 1, characterized in that said theoretical current position (STC) of said current transition is determined in an iterative way from its real current position (PC, ELC) in a set to which it belongs as well as from a real current position (PP, ELP) and the theoretical current position (STP) of a previous transition preceding said current value transition in a preceding set.

3. A method according to claim 2, characterized in that said current position (PC, ELC) of said current transition in said set is determined by the position (PC) of the subset to which said transition belongs in said set, and the position (ELC) of said transition in said subset to which said transition belongs.

4. A method according to claim 2, characterized in that said current value transition and a previous value transition have a relative position (GR) with respect to each other determined by their respective positions in their respective subsets.

5. A method according to claim 1, characterized in that said theoretical current position (STC) of said current transition is indicative of a present set (G) of samples said theoretical current position (STC) really belongs to or of a set of preceding samples (P) or a set of following samples (N) with respect to said present set (G) of samples, and that said output signal (Dout) is generated for a given set indicated by said theoretical current position (STC).

6. A method according to claim 5, characterized in that the value of said output signal (Dout) is equal to said end value (TS) of said transition.

7. A method according to claim 1, characterized in that each of said sets comprises two subsets of equal numbers of samples, each subset comprising a group of four samples obtained by said sampling and an additional sample equal to a last sample of a previous subset.

8. A method according to claim 7, characterized in that the number of samples of the groups of each of said sets is equal to the number of samples obtained by sampling a pulse of said theoretical nominal data input signal.

9. A method according to claim 7, characterized in that real current positions (PC, ELC) of said current value transition in said set is determined by one position (PC) of the subset to which said current value transition belongs in said set, and another position (ELC) of said current value transition in said subset to which said current value transition belongs.

10. A method according to claim 7, characterized in that said current value transition and a previous value transition have a relative position (GR) with respect to each other determined by their respective positions in their respective subsets.

11. A method according to claim 10, characterized in that said theoretical current position is also determined from said relative position (GR).

12. A synchronizing device to synchronize a digital input data signal (Din) with a digital clock signal (CK), said digital input data signal (Din) being rate synchronous with said digital clock signal (CK), said device including a sampling means (S) to sample said digital input data signal (Din);

a grouping means (ST) to group the samples obtained by said sampling means in successive sets each comprising a plurality of successive ones of said samples;

a detection means (D) to detect in each of said successive sets possible value transitions of said samples; and a processing means (SD, M, GE) to process said value transitions, under the control of said digital clock signal to produce an output signal (Dout) which is the digital input signal (Din) synchronized with said digital clock signal (CK), said processing means (P) includes a position determining means (SD) to determine for each current value transition detected in said successive sets of a theoretical current position (STC) in said successive sets of samples assumed to be obtained by sampling a theoretical nominal input data signal and also includes a generation means (GE) to generate said output signal (Dout) using said theoretical current position (STC) and an end value (TS) of said current value transition.

13. A synchronizing device according to claim 12, characterized in that said theoretical current position (STC) of said current transition is determined in an iterative way from its real current position (PC, ELC) in a set to which it belongs as well as from a real current position (PP, ELP) and the theoretical current position (STP) of a previous transition preceding said current value transition a preceding set.

14. A synchronizing device according to claim 13, characterized in that said current position of said current transition in said set is determined by the position (PC) of the subset to which said transition belongs in said set, and the position (ELC) of said transition in said subset to which said transition belongs.

15. A synchronizing device according to claim 13, characterized in that said current value transition and a previous value transition have a relative position (GR) with respect to each other determined by their respective positions in their respective subsets.

16. A synchronizing device according to claim 1, characterized in that said theoretical current position (STC) of said current transition is indicative of a present set (G) of samples said theoretical current position (STC) really belongs to or of a set of preceding samples (P) or a set of following samples (N) with respect to said present set (G) of samples, and that said output signal (Dout) is generated for a given set indicated by said theoretical current position (STC).

17. A synchronizing device according to claim 16, characterized in that the value of said output signal (Dout) is equal to said end value (TS) of said transition.

18. A synchronizing device according to claim 16, characterized in that said processing means includes generation means (GE) for delaying an end value (TS) of said current value transition until a following transition is received, the end value (TS) of said following transition then being used to overwrite said end value (TS) of said current value transition when said theoretical current position (STC) of a following current value transition is indicative of the set of preceding samples (P) said present set of samples said following transition really belongs to or said end value (TS) of said current value transition being used to overwrite the end value (TS) of said following current value transition when said theoretical current position (STC) of said current value transition is indicative of the set of following samples (N) with respect to said present set of samples said current value transition really belongs to, a resulting end value of said current value transition then being provided at an output of said generation means (GE), thereby realizing said output signal (Dout).

19. A synchronizing device according to claim 12, characterized in that each of said sets comprises two subsets of equal numbers of samples, each subset comprising a group of four samples obtained by said sampling and an additional sample equal to a last sample of a previous subset.

20. A synchronizing device according to claim 19, characterized in that the number of samples of the groups of each of said sets is equal to the number of samples obtained by sampling a pulse of said theoretical nominal data input signal.

21. A synchronizing device according to claim 19, characterized in that said current value transition and a previous value transition have a relative position (GR) with respect to each other determined by their respective positions in their respective subsets.

22. A synchronizing device according to claim 21, characterized in that said theoretical current position is also determined from said relative position (GR).

23. A synchronizing device according to claim 12, characterized in that said processing means includes generation means (GE) for delaying an end value (TS) of said current value transition until a following transition is received, the end value (TS) of said following transition then being used to overwrite said end value (TS) of said current value transition when said theoretical current position (STC) of a following current value transition is indicative of the set of preceding samples (P) said present set of samples said following transition really belongs to or said end value (TS) of said current value transition being used to overwrite the end value (TS) of said following current value transition when said theoretical current position (STC) of said current value transition is indicative of the set of following samples (N) with respect to said present set of samples said current value transition really belongs to, a resulting end value of said current value transition then being provided at an output of said generation means (GE), thereby realizing said output signal (Dout).

24. A synchronizing device to synchronize a digital input data signal (Din) with a digital clock signal (CK), said digital input data signal (Din) being rate synchronous with said digital clock signal (CK), said device including sampling means (S) to sample said digital input data signal (Din);

grouping means (ST) to group the samples obtained by said sampling means in successive sets each comprising a plurality of successive ones of said samples;

detection means (D) to detect in each of said successive sets possible value transitions of said samples;

processing means (SD, M, GE) to process said value transitions, under the control of said digital clock signal (CK), to produce an output signal (Dout) which is the digital input signal (Din) synchronized with said digital clock signal (CK);

said processing means (P) includes a position determining means (SD) to determine for each current value transition detected in said successive sets of a theoretical current position (STC) in said successive sets of samples assumed to be obtained by sampling a theoretical nominal input data signal and also includes a generation means (GE) to generate said output signal (Dout) using said theoretical current position (STC) and an end value (TS) of said current value transition;

each of said sets comprises two subsets of equal numbers of samples, each subset comprising a group of four samples obtained by said sampling and an additional sample equal to the last sample of a previous subset; and said real current position of said current value transition in said set is determined by one position (PC) of the subset to which said transition belongs in said set, and another position (ELC) of said current value transition in said subset to which said current value transition belongs.

* * * * *

UNITED STATES PATENT AND TRADEMARK OFFICE
CERTIFICATE OF CORRECTION

PATENT NO.  : 5,400,367
DATED       : March 21, 1995
INVENTOR(S) : Philippe Meylemans, Leon Cloetens It is certified that error appears in the above-indentified patent and that said Letters Patent is hereby corrected as shown below:

On the title page: Item [75]

delete "Van Tsestichlaan" and insert --Herent--.

delete "Kleine Maastrichterstr." and insert --Hasselt--.

Signed and Sealed this

Twenty-ninth Day of August, 1995

Attest:

BRUCE LEHMAN

*Attesting Officer*  *Commissioner of Patents and Trademarks*